United States Patent [19]

Birk

[11] Patent Number: 5,061,454
[45] Date of Patent: Oct. 29, 1991

[54] HIGH PRESSURE SPRAY INJECTOR

[75] Inventor: Aviezer Birk, Aberdeen, Md.

[73] Assignee: The United States of America as represented by the Secretary of the Army, Washington, D.C.

[21] Appl. No.: 373,540

[22] Filed: Jun. 22, 1989

[51] Int. Cl.$^5$ .............................................. B05B 1/00
[52] U.S. Cl. ..................................... 422/119; 239/99; 239/322
[58] Field of Search ...................... 422/78, 80, 119, 51, 422/82.12, 82.13; 239/99, 101, 322

[56] References Cited

U.S. PATENT DOCUMENTS

| | | | |
|---|---|---|---|
| 4,077,569 | 3/1978 | Deines | 230/101 |
| 4,231,283 | 11/1980 | Malburg | 239/101 |
| 4,962,886 | 10/1990 | Stockel | 239/99 |

OTHER PUBLICATIONS

Avi Birk and Phil Reeves, "Facility for Visualization of Liquid Propellant Spray Combustion at High Pressures", Jul. 1988.

Primary Examiner—Robert J. Warden
Assistant Examiner—Howard Hampel
Attorney, Agent, or Firm—Saul Elbaum; Paul S. Clohan; Guy M. Miller

[57] ABSTRACT

A high pressure spray injector having an injector body with an interior cavity and a pedestal located within this cavity, the pedestal having an interior cavity and firmly attached to the bottom of the injector body. Coaxial with the injector body and the pedestal is an annular piston having an end cap and an interior cavity within. The annular piston is in sliding contact with the injector body and the pedestal. A stationary piston is coaxially located within the annular piston and also has an interior cavity. At the end of the stationary piston is a nozzle with an orifice. The annular pistion is also in sliding contact with the stationary piston. A pintle rod is located within the stationary piston to open and close the orifice in the nozzle. As the annular piston is caused to move upward, a fluid is injected in the top part of the annular piston and the interior of the stationary piston. When the annular piston moves downward, the pintle rod moves downward allowing the entrapped fluid to spray through the nozzle. A device for the visualization of the liquid spray during combustion at high pressures is also disclosed.

9 Claims, 3 Drawing Sheets

HIGH PRESSURE SPRAY INJECTOR

RIGHTS OF THE GOVERNMENT

The invention described herein may be manufactured, used and licensed by or for the U.S. Government for Governmental purposes without payment to us of any royalty thereon.

BACKGROUND OF THE INVENTION

The present invention relates to liquid spray injection and is a novel injector which is particularly suited to the research of high pressure injection processes of energetic liquid jets into high pressure reactive gas environments.

Gun technology is currently dominated by solid propellants. Nevertheless, it is becoming more and more apparent that liquid propellants have many advantages over solid propellants. Higher firing rates, greater automation and improved internal ballistic control are examples. New liquid propellants are also much cheaper than their equivalent solid propellants. Additionally, the logistics of liquid propellants are simpler and cheaper than that of solid propellants. The technology of guns using liquid propellants is, however, much more complex than guns using solid propellants. Still, significant progress has been achieved with Regenerative Liquid Propellant (RLP) guns. In these guns, the liquid propellant (normally a monopropellant) is stored in a reservoir outside the gun barrel, and a delivery and injection system is used to transfer the liquid propellant to the combustion chamber; this is where the complexity arises. Pumping equipment, which includes precise volume and pressure control, is readily available, but the state of the art in injectors is such that each specific application requires a new development effort. In RLP guns, the liquid injection is driven by the pressure in the combustion chamber itself via a differential area piston which amplifies the pressure in the liquid reservoir and thereby injects the liquid into the combustion chamber. Very high pressures are involved, anywhere from 2,000 psi to 60,000 psi. Considerable resources are currently committed to investigate the parameters controlling the injection process and to determine the requirements for optimum injector performance, which includes discharge coefficients (mass flow rates for given injection pressures) and liquid jet breakup (spray) in the combustion chamber.

With the exception of the injectors used in RLP guns, prior art injectors derive their injection pressure from sources other than the existing combustion chamber pressure. For example, such sources include pumps and external hydraulic systems which restrict these injectors to low mass flow rates and typically limiting the jets to diameters of less than 1 mm and velocities of less than 120 m/sec, with injection pressures that seldom exceed 5,000 psi. The liquid reservoirs, prior to the initiation of injection, are either exposed to the combustion chamber environment (with the risk of the liquid being ignited catastrophically in the reservoir in the case of monopropellants) or sealed from it by a check valve arrangement, in which case the injection port area fluctuates with the injection pressure, thus perturbing uncontrollably the jet and increasing the risk of liquid ignition in the injection port passage and flame flashback into the liquid reservoir. The RLP gun injector utilizes only the combustion chamber pressure and it is preset to start injection at a particular combustion chamber pressure. It cannot be set (without mechanical modifications) to initiate injection at arbitrary combustion chamber pressures and once injection starts, the injection pressure is solely determined by the geometry of the injector and the combustion chamber pressure. Also, no injection can take place in the absence of significant combustion chamber pressure.

RLP gun injectors can successfully inject jets having annular geometries, but they are not well suited to inject full core jets since in the later geometry it does not provide for pre-injection insulation of the liquid reservoir from the combustion chamber. When research is conducted in this area, it is highly advantageous to inject full core jets since this geometry is more amenable for diagnostics and more easily modeled analytically. The injector described in the present invention utilizes one aspect of operation from the RLP gun injector and is thus capable of high pressure and high mass flow injections; it does not, however, have the limitation of the RLP gun injector and is more versatile and safe (with energetic propellants) than any other known injector.

OBJECTS AND SUMMARY OF THE INVENTION

One object of the invention is to provide an injector that is compact and one that encases all moving parts in one cylindrical housing.

A further object of the invention is to provide an injector that will operate at very high pressures when used with energetic and corrosive liquids.

A still further object is to allow various jet geometries (including annular) to be injected by easily replacing the injector head assembly.

Another object of the invention is to insulate the liquid in the injector from the combustion chamber prior to injection, and, once opened, to prevent fluctuations of the injection port area when injection pressure varies.

Another object is to provide an injector that has an integral pressure transducer to measure the injection pressure. The pressure transducer will also be insulated from any corrosive liquid within the injector.

Another object is to allow injection to be initiated at any combustion chamber pressure, and to provide an injector that will utilize either the combustion chamber pressure or externally provided gas pressure for operation.

Another object is to provide an injector that allows injection pressure to be fully controllable over a wide range without the need for replacement of injector parts and to provide injection response time (i.e., injection pressure rise) that is very rapid (i.e. in milliseconds).

Another object is to inject full core jets that are much thicker than in conventional injectors and with unusually high velocities almost instantaneously.

The present invention is a new and novel mechanical/hydraulic/pneumatic injector which will be very useful in the exploration and design of injection processes as mostly related to RLP guns. It may be employed with a selection of volatile and energetic liquids which include water, monopropellants, kerosene, etc., and is practical and reliable for thousands of operations. The injector and processes disclosed are also applicable to spray injection in liquid fueled combustion engines such as diesel and gasoline, for spray injection in liquid fueled rocket systems, and for spray injection in liquid fueled torpedoes, etc.

Also described is a test chamber to which is admitted high pressure, high temperature gas, and connected to the injector assembly of the present invention which contains an annular piston actuated by the high pressure gas. Movement of the piston axially displaces the test fluid (propellant) through an orifice into the view of a set of windows. The jet spray is then observable by high speed photography, electronic imaging, or by laser projection.

DETAILED DESCRIPTION OF THE PREFERRED EMBODIMENTS

Figure 1:
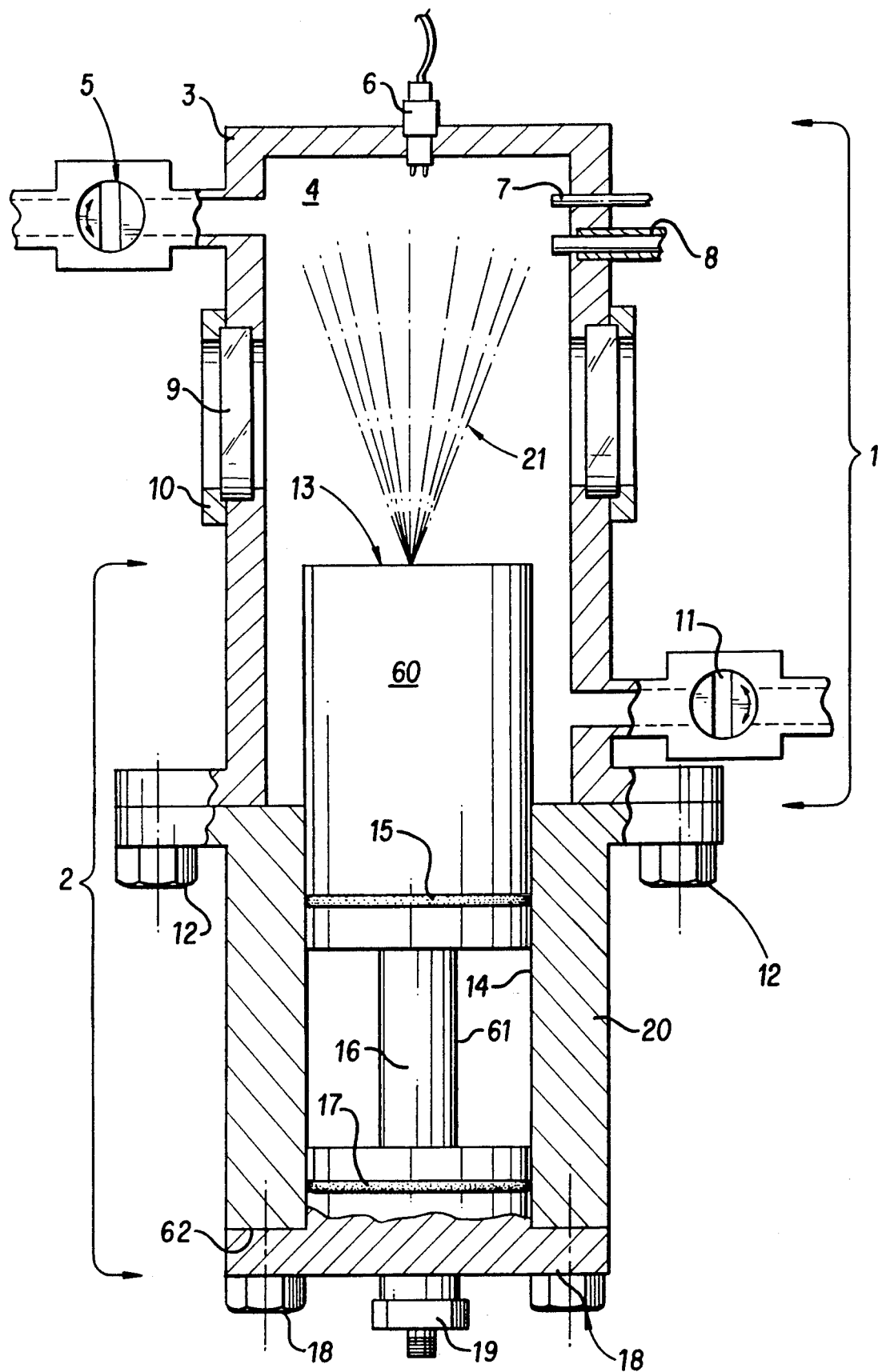
FIG. 1 is a partial cross section of a device for the visualization of a liquid propellant spray combustion at high pressures.

Referring now to FIG. 1 there is shown a device for the visualization of a liquid propellant spray combustion at high pressures consisting of a closed test chamber 1 and an injector assembly 2. Test chamber 1 is sealably attached to injector assembly 2 by bolts 12 or other suitable attachment. High pressure, high temperature gas (10,000 psi and 1,500° F. typically) such as a hypergol like $H_2O_2$ or an oxidizer like $HNO_3$ is supplied by separate means such as combustion, adiabatic, compression, electric heating, and nuclear energy transfer, through conduit piping (not shown). Test chamber housing 3 may be cylindrical, rectangular, or other geometric cross section to provide an internal volume 4 of particular aspect dimension, i.e., length/diameter, volume/wall area, or characteristic length (e.g. L* common to rocket chamber technology). Quick opening inlet valve 5, preferably remotely controlled, is used to admit the gas to test chamber volume 4 on command, with spark plug or glow plug 6 available for ignition. Pressure port 7 and thermocouple/thermopile 8 are used as pressure and temperature sensors. Quartz/sapphire (or equivalent) windows 9, suitably located and attached by retainers 10, which are held in place by bolts or other means, allow photography, optical and-/or electronic viewing of timely sequences of spray development. Annular piston 13 is slidably constrained on its exterior wall 60 to injector body 20 along injector interior cavity wall 14 and is sealed by "O" ring 15. The interior components of annular piston 13 (shown in FIGS. 2 and 3) ride on the exterior wall 61 of concentrically located pedestal 16. Pedestal 16 is sealed along injector interior cavity wall 14 by "O" ring 17 and affixed to bottom end 62 of body 20 by bolts 18. Additional internal instrumentation is provided by gauge 19. Exhaust valve 11 is shown in the closed position. During the active phase of the test sequence, quick opening inlet valve 5 is actuated to allow the high pressure, high temperature gas to enter closed chamber 4 forcing annular piston 13 to axially displace an internally stored fluid such as a hypergol like $KMnO_4$ or a fuel like UDMH through an orifice (not shown) and generate spray pattern 21 which is observable through windows 9, with ambient conditions being read on gauges 7 and 19 and thermocouple 8. At the conclusion of the test cycle, quick acting inlet valve 5 is closed, annular piston 13 has been driven to the full extent of its stroke, and quick acting exhaust valve 11 is actuated to its open position allowing the entrapped gas to pass out of chamber 4.

Figure 2:
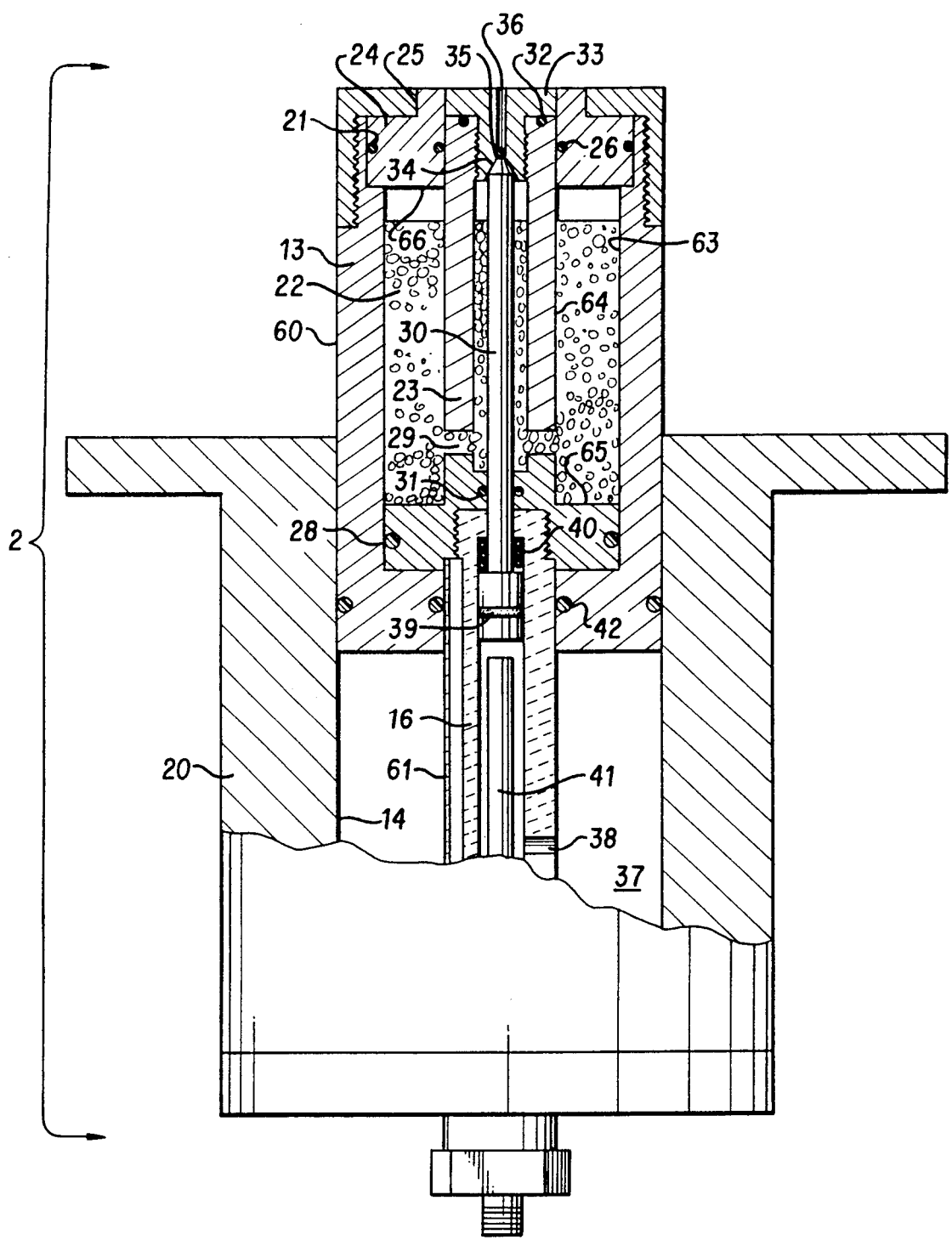
FIG. 2 is a partial cross section of an injector assembly according to the present invention in the nascent configuration.

FIG. 2 shows the active section of injector assembly 2 in the nascent configuration. Test fluid 22 of controlled ullage is contained within the cavity defined by the boundaries of the interior cavity wall 63 of annular piston 13, the exterior wall of stationary piston 23, the bottom flanged end 65 of stationary piston 23 and the lower surface 66 of annular orifice plate 24. Annular orifice plate 24 is captured by a lower inner shoulder located on annular piston 13 and an upper recess on end cap 25 which is threadably attached to piston 13. Alternately, annular orifice plate 24 and end cap 25 could be one piece. Piston 23 is sealed by "O" ring 26 from plate 24, and plate 24 is sealed from piston 13 by "O" ring 27. The integral flange of piston 23 is sealed from piston 13 by "O" ring 28. Fluid via passage 29 also occupies the interior annular cavity formed by the interior cavity wall of piston 23 and the exterior surface of pintle rod 30, and is sealed by "O" ring 31, bottom set within piston 23, and by "O" ring 32 at its top juncture with nozzle 33. Nozzle 33 is removably attached to piston 23 by threads, with conical seat 34 in a sealed mechanical contact with mating surface 35 of pintle 30. Orifice 36 meters the fluid, when open, into test chamber 1 on command. In the nascent configuration, pintle 30 is held in the 34-35 seat contact position by pressure introduced into balance chamber 37 through conduit 38 acting on the bottom of pintle 30, which is sealed by "O" ring 39 and compression spring 40. Pintle 30 is separated from transfer rod 41 and guidably constrained within pedestal 16. Pedestal 16 is sealed against annular piston 13 by "O" ring 42.

Figure 3:
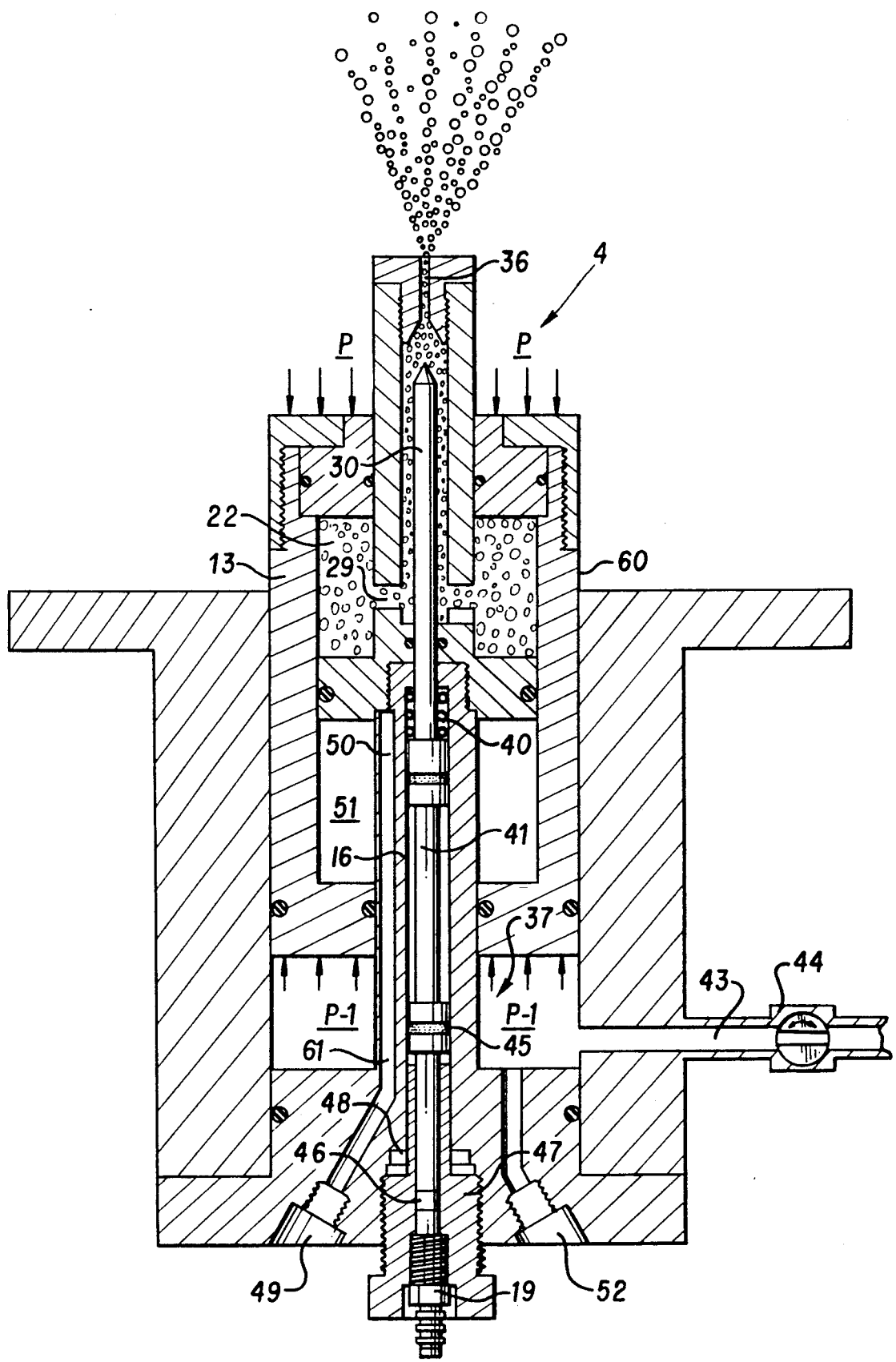
FIG. 3 is a cross section of an injector assembly according to the present invention during spray injection.

In FIG. 3, the pressure P-1 in balance chamber 37 has been relaxed by venting the gas in chamber 37 through passage 43 and quick opening valve 44. Pintle 30 is therefore free to move axially under force from spring 40 to abut transfer rod 41. Operational pressure P, previously introduced into test chamber 4, and operating downward on piston 13 traps test fluid 22 which is then forced through passage 29 into and through orifice 36 to spray into test chamber 1. Transfer rod 41 is sealed by "O" ring 45 and abuts downwardly on hydraulic fluid or grease 46 contained within plug cap 47 which, in turn, contains sealably commercial pressure transducer 19, held by cap 47 which is threadably attached to pedestal 16 and sealed by seal 48. Externally controlled pressure is introduced through channel 49 to passage 50 connecting volume 51 which can be vented or pressurized as required. Passage 52 also may vent balance chamber 37. The unit test cycle is complete as annular piston 13 becomes fully bottomed out.

Spray 21 is thus controlled by nozzle 36 under a selectable pressure magnitude imposed by combinations of pressure/area balances of annular piston 13, annular areas of volume 51 and pressure introduced through passage 50, and annular area of chamber 37 and pressure communicated through valve 44. The timing is established by actuation of the inlet/outlet valving under external command. Alternate embodiments include variations of nozzle 36 geometry and proportions and multi-hole and annular discharge patterning.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A high pressure spray injector comprising:
   a first, second, and third body means in coaxial alignment, said third body means having a nozzle;
   means defining a first interior cavity between said first and said second body means for receiving a pressurized gas;
   means defining a second and third interior cavity between said second and said third body means;
   means defining a fourth interior cavity within said third body means;
   inlet port means communicating with said first interior cavity;
   at least one passage between said third and said fourth interior cavity;
   inlet port means for injecting a fluid communicating with said third interior cavity;
   means for opening and closing said nozzle in said third body means;
   means for discharging said fluid through said nozzle.

2. A high pressure spray injector comprising:
   an injector body having a top end, a bottom end, and an interior cylindrical cavity centrally disposed therein;
   a pedestal centrally disposed within said interior cavity of said injector body, said pedestal having an interior cylindrical cavity centrally disposed therein in coaxial alignment with said injector body, said pedestal fixedly attached at the bottom end of said injector body;
   an annular piston having a top end, a bottom end, and an end cap having a cylindrical bore fixedly attached at the top end, said piston centrally disposed within said interior cylindrical cavity of said injector body, said annular piston having an interior cylindrical cavity centrally disposed therein in coaxial alignment with said injector body, the exterior wall of said piston in sliding contact with the interior cavity wall of said injector body, said piston also in sliding contact at the bottom end with the exterior wall of said pedestal;
   a stationary piston having a top end and a bottom end, said stationary piston fixedly attached at said bottom end to said pedestal and centrally disposed within said annular piston, said stationary piston having an interior cavity centrally disposed therein in coaxial alignment with said injector body, a nozzle having an orifice removably attached at the top end, at least one passage between said interior cavity and the exterior wall of said stationary piston, the exterior wall of said stationary piston in sliding contact with the bore of said end cap of said annular piston, and the bottom end of said stationary piston in sliding contact with the interior cavity wall of said annular piston, said bottom end of said piston having a bore centrally disposed therein;
   a pintle rod centrally disposed within said interior cavity of said stationary piston, said pintle rod extending downward through said bore disposed in said bottom end of said stationary piston into said interior cavity of said pedestal, said pintle rod having a tapering end in mating contact with said orifice of said nozzle and a cylindrical end in sliding contact with the interior cavity wall of said pedestal;
   means for causing said annular piston to extend upward towards said top end of said injector body such that the end cap of said annular piston is flush with said nozzle;
   means for injecting a fluid into the cavity defined by the boundaries of the exterior wall of said stationary piston, the interior cavity wall of said annular piston, the bottom end of said stationary piston and the end cap of said annular piston;
   means for extending said tapering end of said pintle rod away from mating contact with said orifice;
   means for determining the downward pressure exerted by said pintle rod;
   means for causing said annular piston to extend downward toward said bottom end of said injector body thereby forcing said fluid to spray through said orifice of said nozzle.

3. The device of claim 2 wherein said means for causing said annular piston to extend upward toward said top end of said injector body such that the end cap of said annular piston is flush with said nozzle comprises a passage having a quick opening valve extending through the side wall of said injector body and opening at a point below the bottom end of said annular piston for the introduction of a pressurized gas through said passage.

4. The device of claim 2 wherein said means for causing said annular piston to extend downward toward said bottom end of said injector body thereby forcing said fluid to spray through said orifice of said nozzle comprises a passage having a quick opening valve extending through the side wall of said injector body and opening at a point below the bottom end of said annular piston for the release of a pressurized gas through said passage.

5. The device of claim 2 wherein said means for extending said tapering end of said pintle rod away from mating contact with said orifice comprises a spring disposed within said cavity disposed within said pedestal and located above said cylindrical end of said pintle rod.

6. The device of claim 2 wherein said means for injecting a fluid into the cavity defined by the boundaries of the exterior wall of said stationary piston, the interior cavity wall of said annular piston, the bottom end of said stationary piston and the end cap of said annular piston comprises a passage extending through said pedestal and said flange at the bottom of said stationary piston.

7. The device of claim 2 wherein said means for determining the pressure exerted by said pintle rod comprises a pressure transducer disposed within said flanged base of said pedestal.

8. A device for visualization of liquid propellant spray combustion at high pressures comprising:
   an injector body having a top end, a bottom end, and an interior cylindrical cavity centrally disposed therein;
   a pedestal centrally disposed within said interior cavity of said injector body, said pedestal having an interior cylindrical cavity centrally disposed therein in coaxial alignment with said injector body, said pedestal fixedly attached at the bottom end of said injector body;
   an annular piston having a top end, a bottom end, and an end cap having a cylindrical bore fixedly attached at the top end, said piston centrally disposed within said interior cylindrical cavity of said injector body, said annular piston having an interior cylindrical cavity centrally disposed therein in coaxial alignment with said injector body, the exterior wall of said piston in sliding contact with the interior cavity wall of said injector body, said piston also in sliding contact at the bottom end with the exterior wall of said pedestal;

a stationary piston having a top end and a bottom end, said stationary piston fixedly attached at said bottom end to said pedestal and centrally disposed within said annular piston, said stationary piston having an interior cavity centrally disposed therein in coaxial alignment with said injector body, a nozzle having an orifice removably attached at the top end, at least one passage between said interior cavity and the exterior wall of said stationary piston, the exterior wall of said stationary piston in sliding contact with the bore of said end cap of said annular piston, and the bottom end of said stationary piston in sliding contact with the interior cavity wall of said annular piston, said bottom end of said piston having a bore centrally disposed therein;

a pintle rod centrally disposed within said interior cavity of said stationary piston, said pintle rod extending downward through said bore disposed in said bottom end of said stationary piston into said interior cavity of said pedestal, said pintle rod having a tapering end in mating contact with said orifice of said nozzle and a cylindrical end in sliding contact with the interior cavity wall of said pedestal;

means for causing said annular piston to extend upward towards said top end of said injector body such that the end cap of said annular piston is flush with said nozzle;

means for injecting a fluid into the cavity defined by the boundaries of the exterior wall of said stationary piston, the interior cavity wall of said annular piston, the bottom end of said stationary piston and the end cap of said annular piston;

means for extending said tapering end of said pintle rod away from mating contact with said orifice;

means for determining the downward pressure exerted by said pintle rod;

means for causing said annular piston to extend downward toward said bottom end of said injector body thereby forcing said fluid to spray through said orifice of said nozzle;

a test chamber having a closed end, and open end, an inlet valve for injecting a high pressure, high temperature gas, an exhaust valve, a plurality of windows for viewing the interior of said chamber, and an ignition means;

means for determining the pressure and temperature within said test chamber;

said injector body fixedly attached at the open end of said test chamber whereby said spray of said fluid from said orifice is contained and observable within said test chamber.

9. The device of claim 8 wherein said windows are made from quartz/sapphire.

* * * * *